(12) United States Patent
Cai et al.

(10) Patent No.: US 10,713,306 B2
(45) Date of Patent: Jul. 14, 2020

(54) CONTENT PATTERN BASED AUTOMATIC DOCUMENT CLASSIFICATION

(71) Applicant: Microsoft Technology Licensing, LLC, Redmond, WA (US)

(72) Inventors: Daran Cai, Redmond, WA (US); Nakul Garg, Sammamish, WA (US); Michael Dobrzynski, Seattle, WA (US); Wei-Qiang Guo, Redmond, WA (US); Amit Khanna, Redmond, WA (US); Ning Xu, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 288 days.

(21) Appl. No.: 15/713,445

(22) Filed: Sep. 22, 2017

(65) Prior Publication Data
US 2019/0095439 A1 Mar. 28, 2019

(51) Int. Cl.
*G06F 17/00* (2019.01)
*G06F 16/93* (2019.01)
*G06F 16/35* (2019.01)
*G06F 16/31* (2019.01)

(52) U.S. Cl.
CPC ............ *G06F 16/93* (2019.01); *G06F 16/313* (2019.01); *G06F 16/353* (2019.01); *G06F 16/355* (2019.01)

(58) Field of Classification Search
None
See application file for complete search history.

(56) References Cited

U.S. PATENT DOCUMENTS

| 6,463,430 | B1 * | 10/2002 | Brady | G06F 16/353 |
| 8,381,095 | B1 * | 2/2013 | Fischer | G06F 40/177 |
| | | | | 715/234 |
| 8,428,367 | B2 * | 4/2013 | Ahmed | G06Q 10/107 |
| | | | | 382/209 |
| 8,954,440 | B1 * | 2/2015 | Gattani | G06F 16/93 |
| | | | | 707/738 |
| 9,477,756 | B1 | 10/2016 | Park | |
| 2002/0169770 | A1 | 11/2002 | Kim et al. | |
| 2004/0024739 | A1 * | 2/2004 | Copperman | G06F 16/367 |
| 2004/0139059 | A1 * | 7/2004 | Conroy | G06F 16/93 |

(Continued)

OTHER PUBLICATIONS

"International Search Report and Written Opinion Issued in PCT Application No. PCT/US2018/039216", dated Sep. 10, 2018, 13 Pages.

*Primary Examiner* — Hasanul Mobin
(74) *Attorney, Agent, or Firm* — Liang IP, PLLC

(57) ABSTRACT

Computer systems, devices, and associated methods of content pattern based automatic document classification are disclosed herein. In one embodiment, a method includes receiving a document and a sequence of words corresponding to a document class having a class label from a network storage. The method also includes determining a longest common subsequence of words between the words in the document and the sequence of words and calculating a similarity percentage between the document and the sequence of words based on the determined longest common subsequence. When the calculated similarity percentage is above a threshold, the class label corresponding to the document class is automatically applied to the received document in the network storage.

20 Claims, 6 Drawing Sheets

(56) References Cited

U.S. PATENT DOCUMENTS

| | | | |
|---|---|---|---|
| 2006/0103665 A1* | 5/2006 | Opala | G06F 3/14 |
| | | | 345/619 |
| 2006/0282760 A1* | 12/2006 | Tanaka | G06K 9/00469 |
| | | | 715/205 |
| 2009/0192956 A1* | 7/2009 | Dejean | G06F 17/211 |
| | | | 706/12 |
| 2011/0004618 A1* | 1/2011 | Chaudhary | G06F 16/951 |
| | | | 707/769 |
| 2012/0072859 A1* | 3/2012 | Wang | G06K 9/00442 |
| | | | 715/764 |
| 2013/0226843 A1* | 8/2013 | Syeda-Mahmood | G16H 50/70 |
| | | | 706/12 |
| 2016/0055196 A1* | 2/2016 | Collins | G06F 40/197 |
| | | | 707/690 |
| 2019/0057148 A1* | 2/2019 | Wan | G06F 16/35 |

* cited by examiner

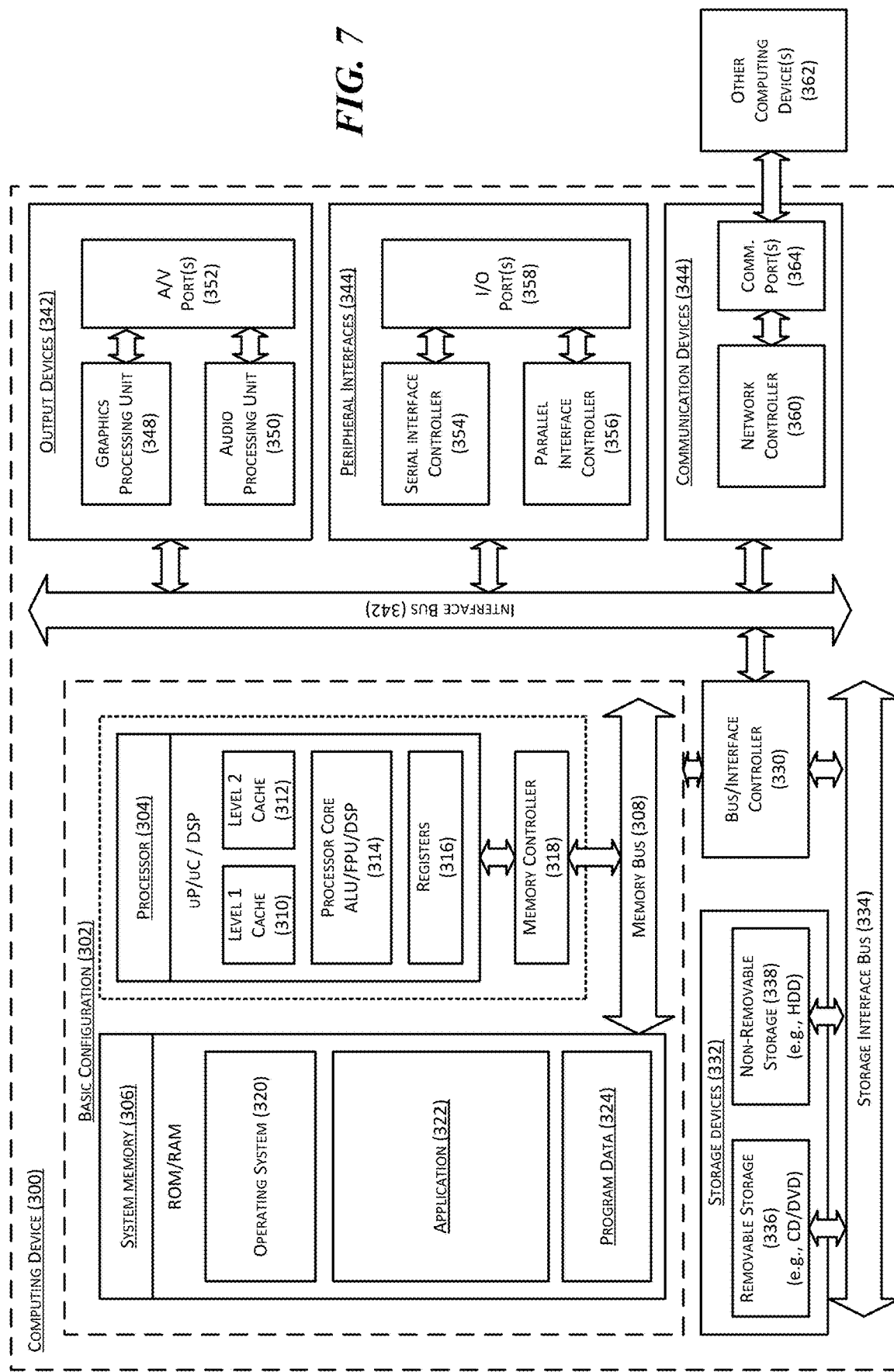

CONTENT PATTERN BASED AUTOMATIC DOCUMENT CLASSIFICATION

BACKGROUND

Corporations, schools, charities, government offices, and other types of enterprises often deploy private computer networks commonly referred to as intranets. Such intranets can allow members of an enterprise to securely share information within the enterprise. For example, an intranet can include a file management system that is configured to store, track, or otherwise manage internal documents of an enterprise. In contrast, the term "internet" typically refers to a public computer network among individuals and enterprises. One example internet contains billions interconnected of computer devices worldwide based on the TCP/IP protocol, and is commonly referred to as the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Intranets can provide members of an enterprise ability to store and manage various types of resources within the enterprise. For example, an intranet can include one or more repositories that store documents, videos, audios, or other types of content items. The intranet can also include a file management system configured to apply access control, retention, or other suitable content management policies. For example, certain categories of documents (e.g., contacts, invoices, tax returns, etc.) may be accessible to one group of users but not another. In another example, certain categories of documents (e.g., purchase orders, health reports, etc.) may be purged after a predetermined period different than other categories of documents. However, in order to efficiently implement content management policies, individual content items may need to be categorized, classified, or otherwise grouped. As such, instead of applying individual policies to each content item, one content management policy may be applied to a set of multiple similar content items content items for efficient management.

One technique for identifying and grouping similar content items includes manually applying a content label (e.g., "contract," "invoice," "purchase order," "health report," "tax return," etc.) to individual content items. Such a technique is time consuming and error prone. Another technique for identifying similar content items includes machine learning implementing, for example, Linear Discriminant Analysis ("LDA") on a training dataset of documents to generate a prediction model. However, machine learning almost always requires a large training dataset that may be difficult to retrieve. The prediction model obtained via machine learning can also be difficult to understand because the prediction model is generated via statistical or other types of mathematical analysis without considering embedded relationships of content in the documents. As such, false predictions (e.g., false positive or negative) based on the generated prediction model may be difficult to explain.

Several embodiments of the disclosed technology are directed to automatically classifying documents or other suitable types of content items based on content patterns in the documents. In certain embodiments, the disclosed technology is directed to identifying a longest common word sequence or subsequence ("LCS") between at least two documents in a training dataset. The LCS identifies a sequence of words common to both documents and can correspond to a content label. The disclosed technology can then include utilizing the identified LCS as a content pattern to classify additional documents. For example, if a similarity of LCS of an additional document to the identified LCS is above a threshold percentage, the additional document can be automatically classified as belonging to the same group or cluster as the original document(s), and the content label can be automatically applied to the additional document. As such, manually applying content labels may be omitted.

Using the LCS of words as a content pattern can also be easy to understand by users and explainable when false predictions occur. The inventors have recognized that a large number of documents generated and/or used in an enterprise are based on similar or the same templates. For example, a 1040 tax return document generally includes a set of titles, subtitles, input field labels, etc. that are common to all 1040 tax returns. A 1040 tax return typically includes the title "1040 U.S. Individual Income Tax Return" and input field labels such as "Your first name and initial," "Last name," "Home address," etc. As such, a LCS for 1040 tax returns can include a string such as "form 1040 U.S. Individual Income Tax Return Your first name and initial Last name Home address . . . ." Thus, the identified LCS of words can be easy for a user to understand. When another document also includes the foregoing LCS or is at least above a threshold percentage similar, the other document is highly likely also a 1040 tax return. Thus, false negative predictions may be reduced or even avoided.

BRIEF DESCRIPTION OF THE DRAWINGS

FIG. 7 is a computing device suitable for certain components of the computing system in FIG. 1.

DETAILED DESCRIPTION

Figure 1:
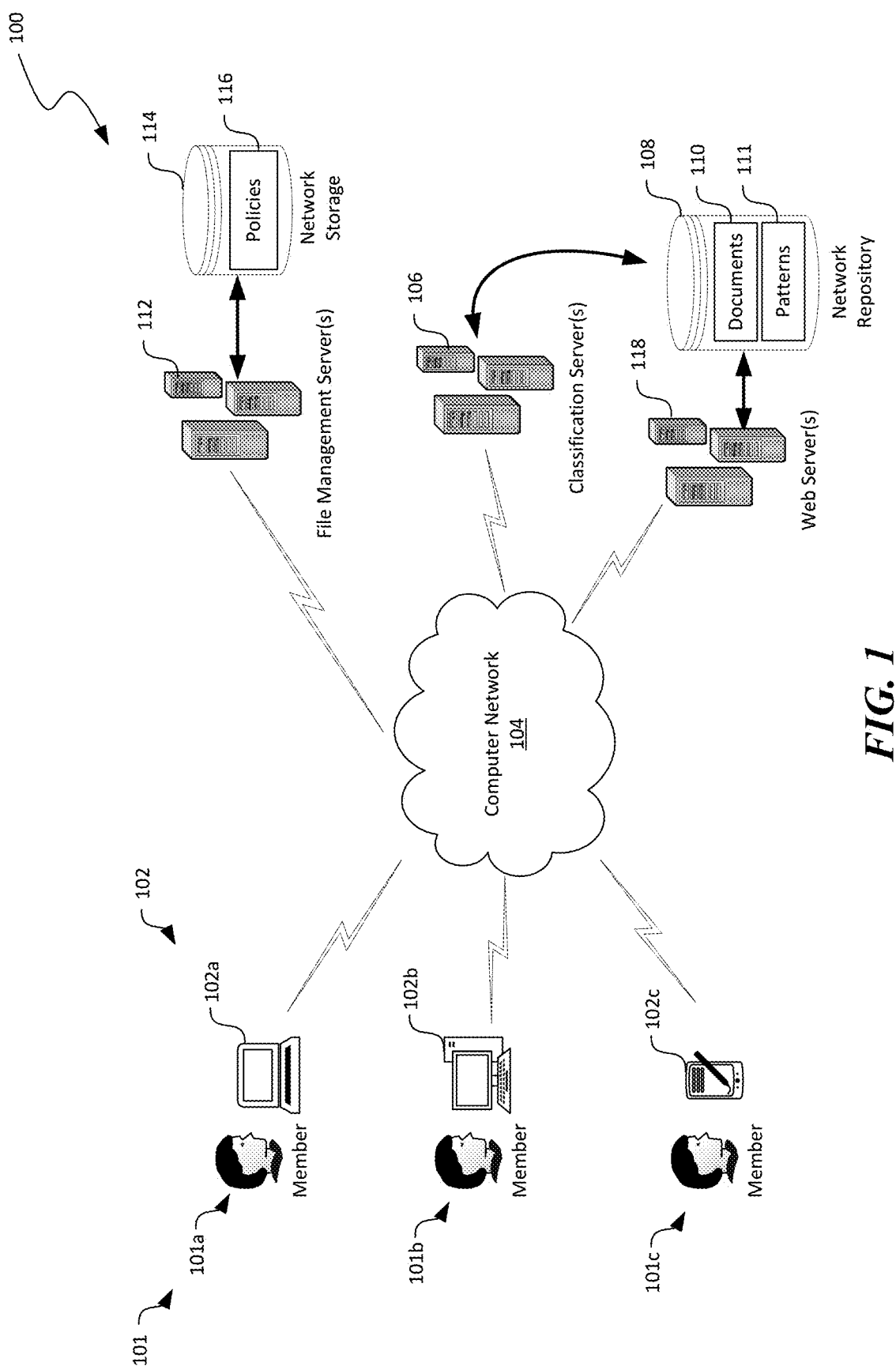
FIG. 1 is a schematic diagram illustrating a computing system implementing content pattern based automatic document classification in accordance with embodiments of the disclosed technology.

Certain embodiments of systems, devices, components, modules, routines, data structures, and processes for content pattern based automatic document classification are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-7.

As used herein, the term "content item" generally refers to an item of information resource accessible via a computer network. For example, a content item can include a document containing text, images, sounds, videos, or animations stored in a network repository and accessible via the computer network. The document can be in plain text format, Word® format, Portable Document Format ("PDF"), Hypertext Markup Language ("HTML"), Extensible Markup Language ("XML"), or other suitable formats. In another example, a content item can also include a website with one or more webpages accessible via the computer network. In additional examples, content items can include blog sites, discussion forums, electronic commerce sites, or other suitable types of resources.

Also used herein, the phrase "content pattern" generally refers to a sequence, identity, and/or other suitable features of text words included in a document or suitable content item. In one example, a content pattern can include a longest common sequence (or subsequence) of words that one document shares with another. Unlike substrings, subsequences of words are not required to occupy consecutive positions within original documents. In other examples, a content pattern can also include a hash value of the longest common sequence of words or other suitable pattern representations.

Identifying and grouping similar content items can be time consuming, costly, and inaccurate. For example, a prediction model generated using machine learning implementing, for example, Linear Discriminant Analysis ("LDA") on a training dataset of documents can be difficult to understand. The prediction model is generated via statistical or other types of mathematical analysis without considering embedded relationships of content in the documents. Also, false predictions (e.g., false positive or negative) based on the generated prediction model may be difficult to explain.

Several embodiments of the disclosed technology are directed to automatically classifying documents based on and by identifying content patterns in documents. In certain embodiments, a longest common word sequence between at least two documents in a training dataset can be identified and used as a content pattern to classify additional documents. Using the LCS as a content pattern can be easy to understand by users and explainable when false predictions occur. The inventors have recognized that a large number of documents generated and/or used in an enterprise are based on similar or the same templates. As such, similar class or type of documents can share with one another a common set of word sequences. When another document also includes the same LCS or is at least above a threshold percentage similar, the other document is likely to also belong to the same class or type. Thus, false negative predictions may be reduced or even avoided, as described in more detail below with reference to FIGS. 1-7.

FIG. 1 is a schematic diagram illustrating a computing system 100 implementing content pattern based automatic document classification in accordance with embodiments of the disclosed technology. As shown in FIG. 1, the computing system 100 can include a computer network 104 interconnecting client devices 102, a classification server 106, a file management server 112, and one or more web servers 118.

The computer network 104 can include an enterprise intranet, a social network, the Internet, or other suitable types of network.

The computing system 100 can also include a network repository 108 operatively coupled to the web servers 118 and a network storage 114 operatively coupled to the file management server 112. As shown in FIG. 1, the network repository 108 can be configured to store records of documents 110 accessible to the client devices 102 via the computer network 104. The network repository 108 can also be configured to store records of content patterns 111 that can be used to automatically classify the documents 110, as described in more detail later. The network storage 114 can be configured to store records of file management policies 116. Example file management policies 116 include access control policies, document retention policies, document modification policies, and/or other suitable types of policies.

Even though particular components and associated arrangements of the computing system 100 are shown in FIG. 1, in other embodiments, the computing system 100 can include additional and/or different components. For example, in certain embodiments, the network repository 108 and the network storage 114 can be combined into a single physical or logical storage space. In other embodiments, the patterns 111 can be stored in the network storage 114 instead of the network repository 108, or in other suitable locations accessible via the computer network 104. In further embodiments, the computing system 100 can also include caching servers, load balancers, or other suitable components.

The client devices 102 can individually include a computing device that facilitates access to the network repository 108 via the computer network 104 by members 101 (identified as first, second, and third members 101a-101c). For example, in the illustrative embodiment, the first client device 102a includes a laptop computer. The second client device 102b includes a desktop computer. The third client device 102c includes a tablet computer. In other embodiments, the client devices 102 can also include smartphones or other suitable computing devices. Even though three members 101 are shown in FIG. 1 for illustration purposes, in other embodiments, the computing system 100 can facilitate any suitable number of members 101 access to the network repository 108 via the computer network 104.

In certain embodiments, the classification server 106, the file management server 112, and the web servers 118 can each include one or more interconnected computer servers, as shown in FIG. 1. In other embodiments, the foregoing components of the computing system 100 can each include a cloud-based service hosted on one or more remote computing facilities such as datacenters. In further embodiments, certain components (e.g., the web servers 118) may be omitted from the computing system 100 and be provided by external computing systems (not shown).

The web servers 118 can be configured to provide one or more websites accessible by the members 101 via the computer network 104. For example, in one embodiment, the web servers 118 can be configured to provide an enterprise internal website that allows the members 101 to securely exchange information and to cooperate on performing tasks. In other embodiments, the web servers 118 can also be configured to provide a social network website that allows the members 101 to post documents 110, comment on one another's documents 110, share and/or recommend documents 110 with additional members 101, or perform other suitable actions. In certain embodiments, the web servers 118 can also be configured to receive and store the documents 110 in the network repository 108. In other embodiments, the computing system 100 can further include a database server (not shown) or other suitable components configured to perform the foregoing functions.

The file management server 112 can be configured to implement various policies 116 to the documents 110 to facilitate access efficiency, security, or other suitable functions. For example, in one embodiment, the file management server 112 can implement access control policies such that certain class, type, category, or other suitable grouping of the documents 110 can be accessible to specified users 101. In another embodiment, the file management server 112 can also implement file retention policies such that certain class, type, category, or other suitable grouping of the documents 110 can be automatically deleted or purged from the network storage 114. In further embodiments, the file management server 112 can implement other suitable types of policies in order to regulate storing, editing, accessing, purging, or other suitable operations on the documents 110.

The classification server 106 can be configured to (i) identify content patterns of subsets of the documents sufficiently similar to one another to be grouped in a single document class; and (ii) using the identified content patterns to automatically classify and apply class label the additional documents 110 in the network repository 108. In certain embodiments, the classification server 106 can be configured to identify a longest common word sequence or subsequence between at least two documents 110 in the network repository 108. The LCS identifies a sequence of words common to both documents 110. When the identified LCS is sufficiently long (e.g., above a threshold), the classification server 106 can indicate that the at least two documents 110 belong to the same document class whose content pattern is the identified LCS. In one implementation, the documents 110 used for identifying the content patterns can be selected randomly. In other implementations, the documents 110 selected for identifying the content patterns can be designated by, for instance, a user 101 or an administrator, as belonging to the same document class. As such, several techniques of pre-classification described below may be omitted, and a content pattern of these selected documents 110 can be calculated directly.

Once the content pattern is identified, the classification server 106 can then utilize the identified content pattern to classify additional documents 110 in the network repository 108. For example, if a similarity of LCS of an additional document 110 to the identified content pattern is above a threshold percentage, the additional document can be automatically classified as belonging to the same document class. In certain embodiments, the classification server 106 can automatically apply a content label corresponding to the document class to the additional document 110. As such, classification of the documents 110 can be automated. Certain embodiments of the classification server 106 are described in more detail below with reference to FIG. 2-5.

Figure 2:
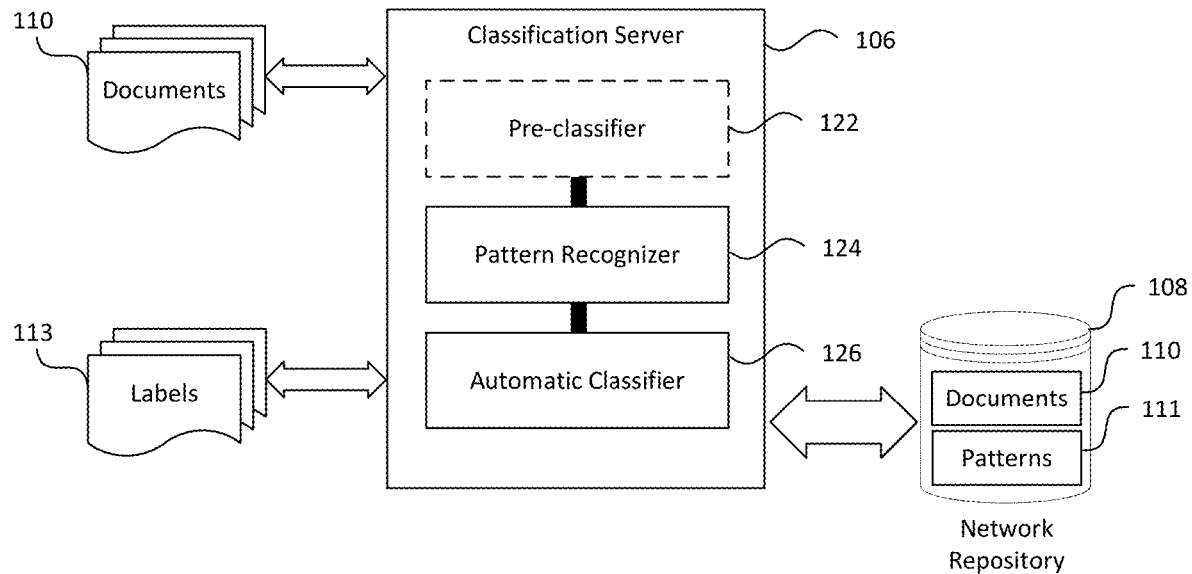
FIG. 2 is a schematic diagram illustrating certain hardware/software components of the classification server of FIG. 1 in accordance with embodiments of the disclosed technology.

FIG. 2 is a schematic diagram illustrating certain hardware/software components of the classification server 106 of FIG. 1 in accordance with embodiments of the disclosed technology. In FIGS. 2-5 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the classification server 106 can include an optional pre-classifier 122, a pattern recognizer 124, and an automatic classifier 126 operatively coupled to one another. In certain embodiments, the pre-classifier 122 can be configured to coarsely divide a set of documents 110 into candidate groups based on layout information of the documents 110. In one embodiment, the pre-classifier 122 can include a HTML converter configured to convert the documents 110 from various formats into HTML documents having layout blocks such <header>, <section>, <article>, <footer>, etc. The pre-classifier 122 can then remove content from the HTML documents such that only the layout blocks remain. The pre-classifier 122 can then compare the layout blocks contained in the HTML documents to determine whether a document 110 should be grouped with one or more other documents 110, as discussed in more detail below with reference to FIG. 3.

The pattern recognizer 124 can be configured to recognize or identify a LCS associated with or shared by one or more documents 110 in order to cluster the documents 110. In certain embodiments, the pattern recognizer 124 can include a plain text converter configured to convert the documents 110 in a candidate group into plain text documents without any layout or format information. As such, the converted documents 110 can include a sequence of words in plain text. The pattern recognizer 124 can then compute a LCS between two plain text documents. In one embodiment, if a number of words in the computed LCS exceeds a clustering threshold, the two documents are deemed to be similar enough to be in an cluster. Otherwise, the two documents can be placed in two separate cluster. In other embodiments, the pattern recognizer 124 can calculate a hash value of the individual identified LCS strings between pairs of the documents 110 and compare similarities between pairs of the documents 110 based on the hash values. The computed LCS can also be cached for later processing. The pattern recognizer 124 can also be configured to repeat the foregoing operations with remaining documents in the approximate group to generate one or more clusters.

Once the clustering of the documents 110 is complete, the pattern recognizer 124 can be configured to generate content patterns 111 using the cached LCS values of the documents 110. For example, in one embodiment, when a LCS value between two initial documents 110 are sufficiently similar (e.g., above a threshold higher than the clustering threshold), the pattern recognizer 124 can indicate that the two documents 110 belong to a single class. The pattern recognizer 124 can then compare another document in the cluster to the LCS of the two initial documents 110. If sufficiently similar, the pattern recognizer 124 can indicate that the other document also belongs to the same document class. Otherwise, the pattern recognizer 124 can indicate that the other document belongs to a different document class. Once all documents 110 in the cluster is processed, sufficiently similar documents 110 can be grouped into different classes with corresponding content patterns 111. Certain embodiments of the pattern recognizer 124 are described below with reference to FIG. 4.

The automatic classifier 126 can be configured to use the identified content patterns 111 to automatically classify additional documents 110 (e.g., those not in the initial set) in the network repository 108. For example, the automatic classifier 126 can compare another document to an identified content pattern 111 corresponding to a document class by calculating an LCS therebetween. If the calculated LCS is sufficiently similar (e.g., above a threshold percentage similar), the other document 110 can be automatically classified as belonging to the corresponding document class. In certain embodiments, a class label of the document class can be automatically applied, for example, as new metadata to the other document 110 in the network repository 108. Certain embodiments of the pattern recognizer 124 are described below with reference to FIG. 5.

Figure 3:
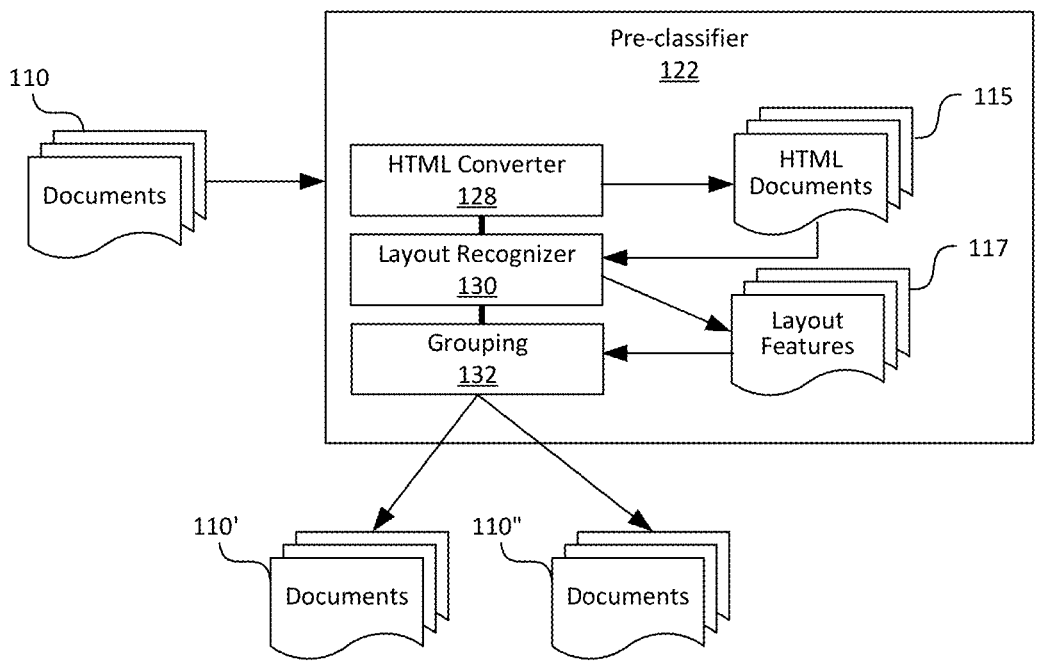
FIG. 3 is a schematic diagram illustrating certain hardware/software components of the pre-classifier of FIG. 2 in accordance with embodiments of the disclosed technology.

FIG. 3 is a schematic diagram illustrating certain hardware/software components of the pre-classifier 122 of FIG. 2 in accordance with embodiments of the disclosed technology. As shown in FIG. 3, the pre-classifier 122 can include an HTML converter 128, a layout recognizer 130, and a grouping component 132 operatively coupled to one another. Even though particular components of the pre-classifier 122 are shown in FIG. 3, in other embodiments, the pre-classifier 122 can also include interface, calculation, and/or other suitable components.

The HTML converter 128 can be configured to convert the documents 110 into HTML documents 115. In certain embodiments, the HTML converter 128 can be configured to recognize page, paragraph, font, or other suitable formats of the documents 110 and add suitable HTML tags and corresponding attributes. Example tags can include <html>, <head>, <title>, <body>, etc. and corresponding attributes. The following is an example HTML document 115:

```
<!DOCTYPE html>
<html>
<body>
<h1>My First Heading</h1>
<p>My first paragraph.</p>
</body>
</html>
```

As shown above, the example HTML document 115 includes a document type tag (i.e., "<!DOCTYPE html>"), a beginning HTML document tag (i.e., "<html>") with a corresponding end HTML document tag (i.e., "</html>"), a beginning document body tag (i.e., "<body>") and a corresponding end document body tag (i.e., "</body>"), first header tags (i.e., "<h1>" and "</h1>"), and paragraph tags (i.e., "<p>" and "</p>"). The example HTML document 115 also includes content for the first header (i.e., "My First Heading") and the paragraph (i.e., "My first paragraph"). In other embodiments, the HTML converter 128 can also generate the HTML tags for the documents 110 by performing text recognition, for instance, on a PDF document and/or performing other suitable operations.

The layout recognizer 130 can be configured to recognize layout features 117 of the HTML document 115. In certain embodiments, the layout recognizer 130 can be configured to perform a search and replace with a space any text not enclosed by "<" and ">" in order to remove content from the HTML document 115. As such, for the example HTML document 115 described above, the layout recognizer 130 can recognize corresponding layout features 117 as follows:

```
<!DOCTYPE html>
<html>
<body>
<h1> </h1>
<p> </p>
</body>
</html>
```

Thus, as shown above, only the HTML tags of the example HTML document 115 remains. In other embodiments, the layout recognizer 130 can be configured to recognize the layout features 117 by extracting the HTML tags and/or via other suitable techniques.

The grouping component 132 can be configured to determine whether subsets of the documents 110 belong to a candidate group based on the layout features 117 generated by the layout recognizer 130. In one embodiment, the grouping component 132 can be configured to derive a hash value for each of the layout features 117. The grouping component 132 can then compare the individual hash values and determine whether a similarity of the hash values is above a threshold. In response to determining that the hash values are sufficiently similar, the grouping component 132 can be configured to designate that corresponding documents 110 belong to the same candidate group. As shown in FIG. 3, two candidate groups 110' and 110" are shown for illustration purposes. In other embodiments, one, three, five, or any other suitable number of candidate groups may result. In further embodiments, the grouping component 132 can be configured to compare the layout features 117 via string comparison and/or other suitable techniques. Operations of various components of the pre-classifier 122 are described in more detail below with reference to FIG. 6B.

Figure 4:
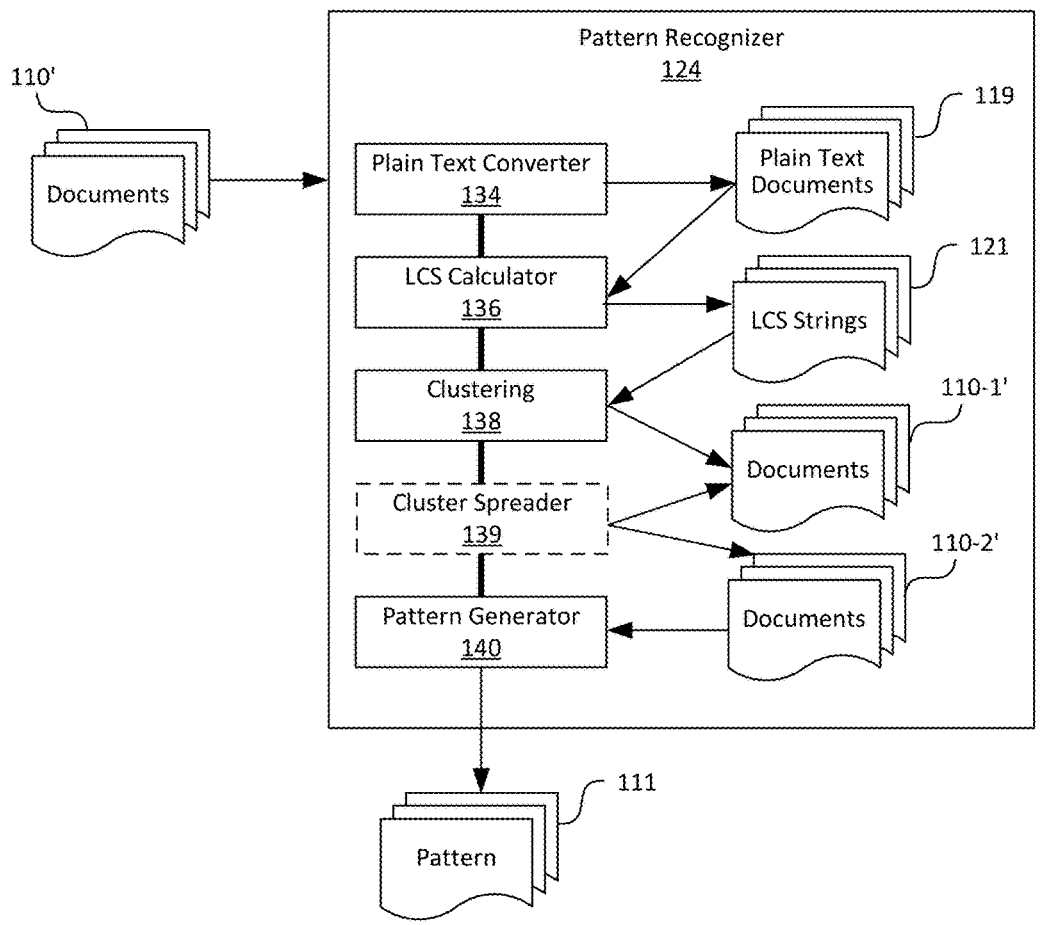
FIG. 4 is a block diagram illustrating certain hardware/software components of the pattern recognizer of FIG. 2 in accordance with embodiments of the disclosed technology.

FIG. 4 is a block diagram illustrating certain hardware/software components of pattern recognizer 124 in FIG. 2 in accordance with embodiments of the disclosed technology. As shown in FIG. 4, the pattern recognizer 124 can include a plain text converter 134, a LCS calculator 136, a clustering component 138, an optional cluster spreader 139, and a pattern generator 140 operatively coupled to one another. Even though particular components of the pattern recognizer 124 are shown in FIG. 4, in other embodiments, the pattern recognizer 124 can also include interface and/or other suitable components.

The plaint text converter 134 can be configured to convert the documents 110' in a candidate group into plain text documents 119. In certain embodiments, the plaint text converter 134 can be configured to extract only text from the documents 110' without any data representing formatting or other types of metadata. As such, the plain text documents 119 include only a string of text representing the content of the documents 110' without any formatting. In other embodiments, the plaint text converter 134 can also be configured to perform optical character recognition of, for instance, a PDF document 110' in order to recognize text contained therein. In further embodiments, the plaint text converter 134 can also be configured to implement other suitable text recognition or extraction techniques in order to generate the plain text documents 119 from the received documents 110'.

The LCS calculator 136 can be configured to calculate a LCS between two of the plaint text documents 119 each having a string of words. The LCS calculator 136 can be configured to implement various functions for deriving the LCS and associated parameters using the strings of words in the plaint text documents 119 as input sequences. For example, the function below takes as input sequences X[1 . . . m] and Y[1 . . . n] and computes a length of LCS between X[1 . . . i] and Y[1 . . . j] for all 1≤i≤m and 1≤j≤n, and stores results in C[i,j]:

```
function LCSLength(X[1..m], Y[1..n])
    C = array(0..m, 0..n)
    for i := 0..m
        C[i,0]= 0
    for j := 0..n
        C[0,j] = 0
    for i := 1..m
        for j := 1..n
            if X[i] = Y[j]
                C[i,j] := C[i-1,j-1] + 1
            else
                C[i,j] := max(C[i,j-1], C[i-1,j])
    return C[m,n]
```

In another example, the following function outputs the LCS between X and Y as R:

```
function backtrackAll(C[0..m,0..n], X[1..m], Y[1..n], i, j)
    if i = 0 or j = 0
        return {""}
    else if X[i] = Y[j]
        return {Z + X[i] for all Z in backtrackAll(C, X, Y, i-1, j-1)}
    else
        R := { }
        if C[i,j-1] ≥ C[i-1,j]
            R := R ∪ backtrackAll(C, X, Y, i, j-1)
        if C[i-1,j] ≥ C[i,j-1]
            R := R ∪ backtrackAll(C, X, Y, i-1, j)
        return R
```

As such, the LCS calculator 136 can generate LCS strings 121 as well as corresponding lengths based on the plaint text documents 119.

The clustering component 138 can be configured to assign the documents 110' into separate clusters based on a relative similarity to one another. In certain embodiments, the clustering component 138 can compare a length of identified LCS between two initial documents 110'. When the length of the LCS (e.g., above a percentage of the original documents 110) is above or equal to a clustering threshold, the clustering component 138 can indicate that the two documents 110' belong to the same cluster having a content pattern that is the identified LCS. For example, if the length of the LCS of two documents 110' is more than 75% of the original documents 110, the clustering component 138 can indicate that the two documents 110' belong to the same cluster, and the LCS. Subsequently, the clustering component 138 can be configured to test whether additional documents 110 can be included to the cluster by calculate a new LCS between the LCS between the original documents 110 and each of the additional documents 110. When the calculated new LCS is longer than the clustering threshold, the clustering component 138 can indicate that the additional document 110 also belong to the cluster and then update the content pattern of the cluster with the new LCS. When the calculated new LCS is shorter than the clustering threshold, the clustering component 138 can indicate that the additional document 110 belongs to a new cluster. Then, the clustering component 138 can test the remaining documents 110 for both clusters as described above. In further embodiments, the clustering component 138 can cluster the documents 110' based on the LCS strings 121 in other suitable manners.

As shown in FIG. 4, the pattern recognizer 124 can optionally include a cluster spreader 139 configured to merge clusters when overlaps exists therebetween. The inventors have recognized that an order of comparing the documents 110' in the foregoing operations of the clustering component 138 may impact the resulting clusters. For example, when first, second, and third documents 110' are compared in series, the first and second documents 110' may be in one cluster while the third may be in another. However, when the first document 1010' is compared to the third document before being compared to the second document 110', the first and third documents 110' may be in one cluster while the second is in another because both the second and third documents 110' share similarity with the first document 110' but not with each other. As such, inconsistent clustering may result based on different processing orders.

To improve consistency of determining the clusters, the pattern recognizer 124 can include the cluster spreader 139 configured to apply a cluster spread technique. In particular, subsequent to generating the clusters, the cluster spreader 139 can perform the foregoing LCS computing and comparing operations on additional documents 110 among the different clusters. If a document 110' in one cluster is similar enough to another in a different cluster, the two clusters may be merged into one cluster. As such, content overlaps between documents 110' in different clusters can be identified to reduce inconsistency of clustering. As shown in FIG. 4, two clusters 110-1' and 110-2' are shown for illustration purposes.

In further embodiments, the pattern recognizer 124 can also be configured to perform a "neighbor clustering" technique as described below. In one implementation, in each spread cluster, the pattern recognizer 124 can be configured to calculate a similarity spread to determine dominate clusters. The pattern recognizer 124 can then find a center document 110 of each dominate cluster and determine sub-clusters therein. For instance, in certain embodiments, determining the sub-clusters can include selecting candidate documents 110 from un-clustered documents 110 whose relevance or similarity (e.g., based on an LCS) with the center document 110 is above a threshold. A candidate sub-cluster can then be created which contain the LCS between the candidate document 110 and the center document 110. The pattern recognizer 124 can then be configured to use the similarity spread to cluster the other candidate documents 110 to create clusters related to the center document 110. The pattern recognizer 124 can then be configured to check whether the sub-clusters can form valid clusters, for example, by selecting a sub-cluster the center document 110 can belong to base on the length of LCS. The pattern recognizer 124 can then be configured to update the unclustered document list to exclude the documents 110 that have been included in the sub-clusters.

Once the documents 110' are clustered, the pattern generator 140 can then generate the content patterns 111 based on, for example, the cached values of the CLS calculated by the LCS calculator 136. In one embodiment, the pattern generator 140 can determine whether an initial LCS between two documents 110' are sufficiently similar, for example, having a number of shared words in a sequence above a pattern threshold. If the two documents 110' are sufficiently similar, the pattern generator 140 can then indicate that the two documents 110' belong to the same document class and associate the LCS with the document class. The pattern generator 140 can then use the initial LCS to locate other documents 110' that have the same or substantially similar LCS (e.g., more than 90%, 95%, or 99% similar). Once determined, the pattern generator 140 can assign documents 110' having the same or substantially similar LCS in a document class with corresponding LCS values. Operations of various components of the pattern recognizer 124 are described in more detail below with reference to FIG. 6C.

Figure 5:
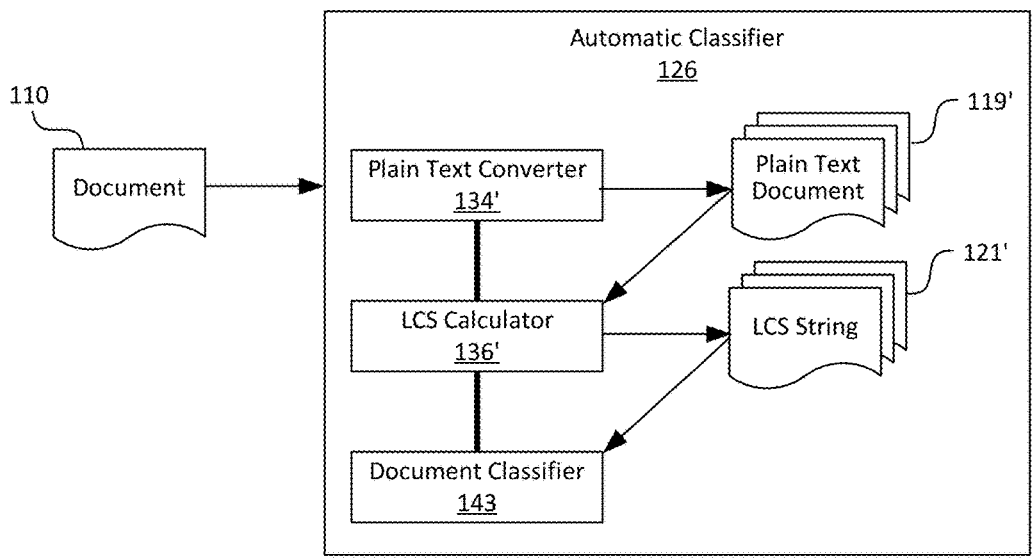
FIG. 5 is a block diagram illustrating certain hardware/software components of the automatic classifier of FIG. 2 in accordance with embodiments of the disclosed technology.

FIG. 5 is a block diagram illustrating certain hardware/software components of automatic classifier 126 in FIG. 2 in accordance with embodiments of the disclosed technology. As shown in FIG. 5, the automatic classifier 126 can include a plain text converter 134', a LCS calculator 136', and a document classifier 143 operatively coupled to one another. In certain embodiments, the plain text converter 134' and LCS calculator 136' can be generally similar in structure and function to the plain text converter 134 and LCS calculator 136 in FIG. 4, respectively. In other embodiments, the plain text converter 134' and LCS calculator 136' can be different than those shown in FIG. 4.

The document classifier 143 can be configured to determine whether an additional document 110 belongs to a particular document class with a corresponding pattern 111. In certain embodiments, the plaint text converter 134' can be configured to convert the document 110 into a plain text document 119'. The LCS calculator 136' can then calculate a LCS string 121' by comparing the plain text document 119' with the pattern 111. As such, the document classifier 143 can determine whether the document 110 is sufficiently similar to the pattern 111 by determining whether a percentage of similarity between the document 110 and the pattern 111 is above the clustering threshold (or other suitable thresholds). In response to determining that the document 110 is sufficiently similar to the pattern 111, the document classifier 143 can indicate that the document 110 belongs to the document class with the pattern 111 and can automatically assign a class label (e.g., "contract", "invoice," etc.) to the document 110 by, for instance, modifying metadata of the document 110. Operations of various components of the automatic classifier 126 are described in more detail below with reference to FIG. 6D.

Several embodiments of the disclosed technology can more efficiently and accurately classify documents 110 than manually applying class labels or using machine learning. The inventors have recognized that a large number of documents generated and/or used in an enterprise are based on similar or the same templates. For example, a 1040 tax return document generally includes a set of titles, subtitles, input field labels, etc. that are common to all 1040 tax returns. A 1040 tax return typically includes the title "1040 U.S. Individual Income Tax Return" and input field labels such as "Your first name and initial," "Last name," "Home address," etc. As such, a LCS for 1040 tax returns can include a string such as "form 1040 U.S. Individual Income Tax Return Your first name and initial Last name Home address . . . ." Thus, the identified LCS of words can be easy for a user to understand. When another document also includes the foregoing LCS or is at least above a threshold percentage similar, the other document is highly likely also a 1040 tax return. Thus, false negative predictions may be reduced or even avoided.

Figure 6A:
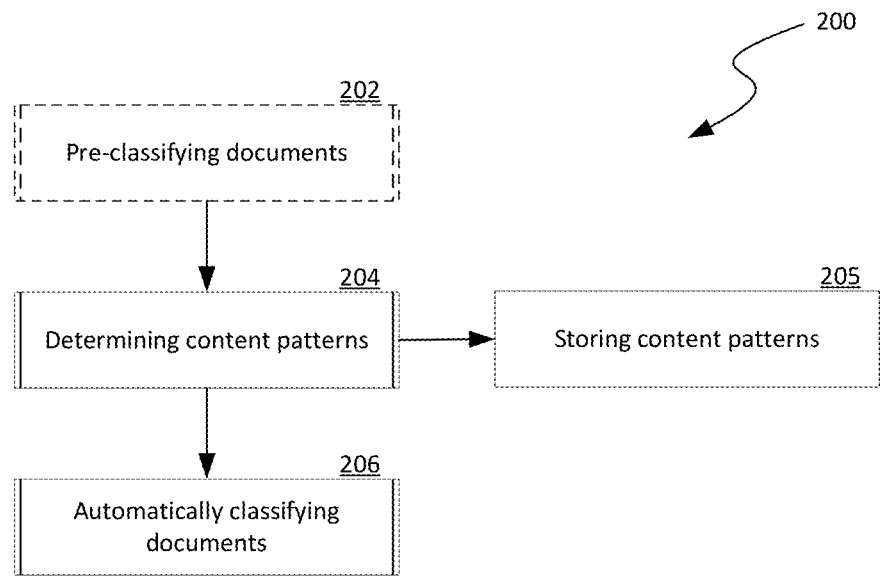
FIGS. 6A-6D are flowcharts illustrating various aspects of a process of content pattern based automatic document classification in accordance with embodiments of the disclosed technology.

FIG. 6A is a flowchart illustrating a process 200 of content pattern based automatic document classification in accordance with embodiments of the disclosed technology. Even though embodiments of the process 200 are described in the context of the computing system 100 and components of the classification server 106 shown in FIGS. 2-5, in other embodiments, the process 200 can also be implemented in computing systems with additional and/or different components.

As shown in FIG. 6A, the process 200 can include an optionally stage 202 of pre-classifying documents. In certain embodiments, pre-classifying documents can include grouping documents into candidate groups based on similarity of layout features of the documents, as described in more detail below with reference to FIG. 6B. In other embodiments, pre-classifying documents can also include filtering documents based on file format, file size, and/or other suitable criteria.

The process 200 can also include determining content patterns at stage 204 and storing the determined content patterns in, for example, the network repository 108 of FIG. 1 at stage 205. In certain embodiments, the content patterns can individually include a LCS string shared by documents in a document class. For example, a LCS string for a document class of tax returns can include "form 1040 U.S. Individual Income Tax Return Your first name and initial Last name Home address . . . ." In other embodiments, the content patterns can also include a hash value of the LCS strings and/or other suitable parameters. Example operations of determining the content patterns are described below with reference to FIG. 6C.

The process 200 can then include automatically classifying additional documents using the determined content patterns at stage 206. In certain embodiments, the additional document can be compared to a content pattern to determine a similarity value therebetween. If the similarity value is above a threshold (e.g., 90%, 95%, or 99%), the additional document is indicated to be belonging to the document class having the content pattern. In other embodiments, the automatically classifying the additional document can also include automatically assigning a class label to the additional document by, for instance, modifying metadata of the document in the network repository 108 of FIG. 1. Example operations of determining the content patterns are described below with reference to FIG. 6D.

Figure 6B:
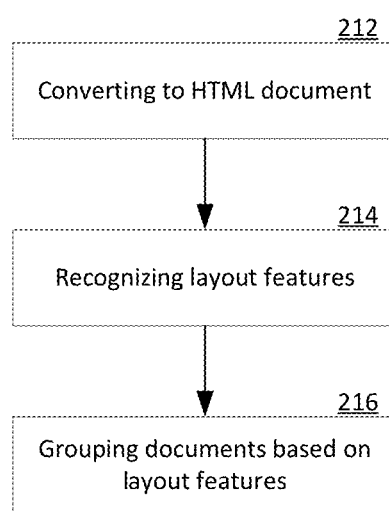

FIG. 6B illustrate example operations of pre-classifying documents. As shown in FIG. 6B, the operations can include converting a document in a first format (e.g., Word®, PDF, or other suitable formats) into a HTML document having layout tags and associated attributes at stage 212. The operations can then include recognizing layout features from the HTML document by removing any content (e.g., text, picture, etc.) from the HTML document at stage 214. Subsequently, subsets of the documents can be assigned to candidate groups when the subsets of documents share a certain similarity (e.g., a percentage of hash values) of layout features at stage 216.

Figure 6C:
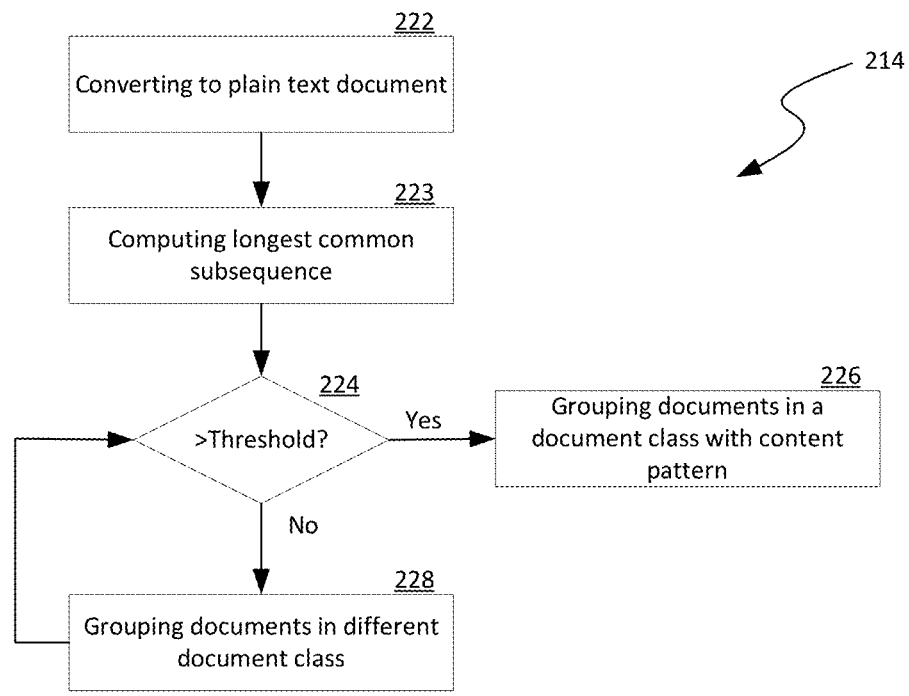

FIG. 6C illustrates example operations for automatically classifying documents in a document candidate group and/or cluster. As shown in FIG. 6C, the operations can include converting a document into a plain text document at stage 222. The operations can then include computing a LCS between two plaint text documents at stage 223. The LCS can include a sequence of words having a corresponding length of words. The operations can then include a decision stage 224 to determine whether the length of the LCS is above a threshold. If the length of the LCS is above the threshold, the operations can include grouping the documents together in a document class and using the LCS as the content pattern for the document class at stage 226. If the length of the LCS is not above the threshold, the operations can include grouping the documents into different document classes at stage 228. The foregoing operations can then be repeated until all documents in the candidate group and/or cluster are processed.

Figure 6D:
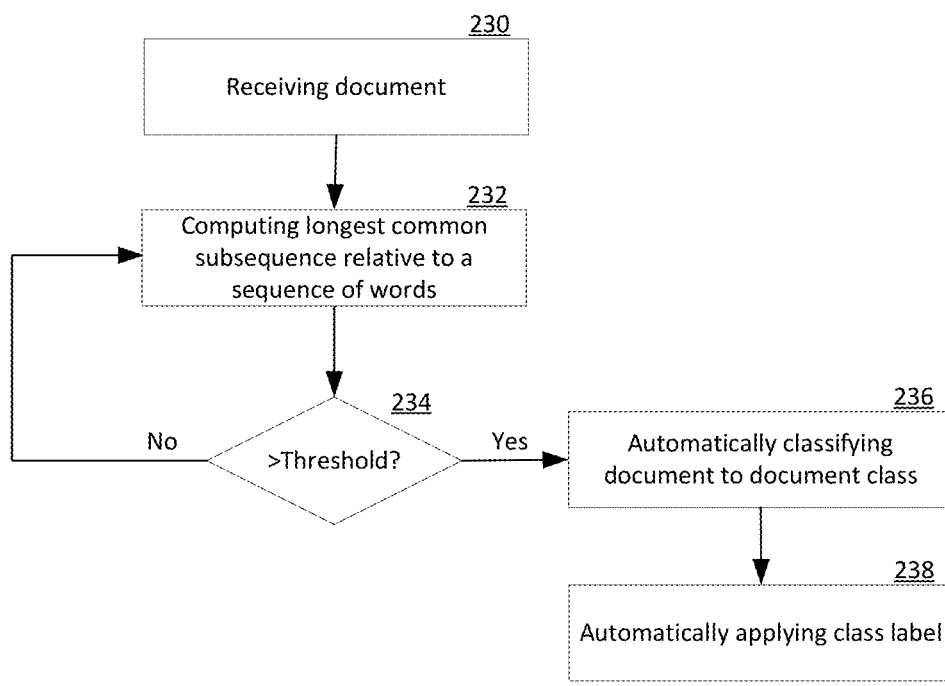

FIG. 6D illustrates example operations for automatically classifying an additional document. As shown in FIG. 6D, the operations can include receiving the additional document at stage 230. The operations can then include computing a LCS relative to a content pattern at stage 232. For example, the content pattern can include a sequence of words shared by documents in a document class. The operations can then include a decision stage 234 to determine whether the calculated LCS represents a similarity greater than a threshold. In response to determining that the similarity is not greater than the threshold, the operations revert to computing LCS for additional documents at stage 232. Otherwise, the operations include automatically classifying the additional document as belonging to the document class at stage 236 and optionally automatically applying a class label to the additional document at stage 238.

FIG. 7 is a computing device 300 suitable for certain components of the computing system 100 in FIG. 1. For example, the computing device 300 can be suitable for the client devices 102, classification server 106, the file management server 114, or the web browser 118 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A computer-implemented method for content pattern based document classification in a file management system having a network storage containing multiple documents accessible to multiple members via a computer network, the method comprising:
   receiving, from the network storage, data representing a first document and a second document, both the first and second documents containing words in sequences;
   in response to receiving the data representing the first and second documents,
      computing a longest common subsequence of words of the first and second documents, the longest common subsequence having a number of words shared by the first and second documents; and
      upon determining that the number of words of the computed longest common subsequence is above a threshold,
         indicating that the first document and the second document belong to a document class having the computed longest common subsequence as a content pattern; and
         automatically classifying, using the content pattern having the computed longest common subsequence between the first and second documents, additional documents in the network storage as belonging to the same document class when a longest common sequence between the individual additional documents relative to the content pattern is above the threshold; and
         modifying metadata of the classified additional documents in the network storage of the file management system to apply a class label corresponding to the document class.

2. The method of claim 1, further comprising converting the first and second documents to first and second plain text documents by removing layout or format data from the first and second documents, and wherein computing the longest common subsequence of words includes computing a longest common subsequence of words between the first and second plain text documents.

3. The method of claim 1 wherein the longest common subsequence is a first longest common subsequence, and wherein automatically classifying additional documents includes:
   receiving a third document having words in a sequence;
   in response to receiving the third document,
      computing a second longest common subsequence of words between the third document and the first longest common subsequence;
      determining whether a number of words of the second computed longest common subsequence is above the threshold; and
      in response to determining that the number of words of the second longest common subsequence is above the threshold, indicating that the third document also belongs to the document class and automatically assigning to the third documents the class label corresponding to the document class.

4. The method of claim 1 wherein the longest common subsequence is a first longest common subsequence, and wherein automatically classifying additional documents includes:
   receiving a third document having words in a sequence;
   in response to receiving the third document,
      computing a second longest common subsequence of words between the third document and the first longest common subsequence;
      determining whether a number of words of the second computed longest common subsequence is above the threshold; and
      in response to determining that the number of words of the second longest common subsequence is above the threshold, indicating that the third document belongs to another document class different than the document class.

5. The method of claim 1 wherein:
the threshold is a first threshold; and
the method further includes:
   determining whether the number of words of the computed longest common subsequence is above a second threshold that is lower than the first threshold; and
   in response to determining that the number of words is above the second threshold, grouping the first and second documents in a document group before determining whether the number of words of the computed longest common subsequence is above the first threshold.

6. The method of claim 5, further comprising:
receiving a third document having words in a sequence;
in response to receiving the third document,
   computing another longest common subsequence of words between the second document and the third document, the computed longest common subsequence having another number of words shared by the second and third documents;
   determining whether the another number of words of the another computed longest common subsequence is above the second threshold; and
   in response to determining that the another number of words of the another computed longest common subsequence is above the second threshold, grouping the third document with the first and second documents in the document group.

7. The method of claim 5, further comprising:
receiving a third document having words in a sequence;
in response to receiving the third document,
   computing another longest common subsequence of words between the second document and the third document, the computed longest common subsequence having another number of words shared by the second and third documents;
determining whether the another number of words of the another computed longest common subsequence is above the second threshold; and
in response to determining that the another number of words of the another computed longest common subsequence is not above the second threshold,
computing a further longest common subsequence of words between the first document and the third document, the computed longest common subsequence having a further number of words shared by the first and third documents;
determining whether the further number of words of the further computed longest common subsequence is above the second threshold; and
in response to determining that the further number of words is above the second threshold, grouping the third document with the first and second documents in the document group.

8. The method of claim 5, further comprising:
receiving a third document having words in a sequence;
in response to receiving the third document,
computing another longest common subsequence of words between the second document and the third document, the computed longest common subsequence having another number of words shared by the second and third documents;
determining whether the another number of words of the another computed longest common subsequence is above the second threshold; and
in response to determining that the another number of words of the another computed longest common subsequence is not above the second threshold,
computing a further longest common subsequence of words between the first document and the third document, the computed longest common subsequence having a further number of words shared by the first and third documents;
determining whether the further number of words of the further computed longest common subsequence is above the second threshold; and
in response to determining that the further number of words is not above the second threshold, indicating that the third document belongs to a new document group different than the document group containing the first and second documents.

9. The method of claim 1, further comprising:
in response to receiving the first and second documents,
converting the first and second documents into first and second Hypertext Markup Language ("HTML") documents, respectively, both containing layout data and content data;
removing the content data from both the first and second HTML documents;
determining a similarity value between the layout data of the first and second HTML documents; and
when the determined similarity value is above a layout threshold, grouping the first and second documents in a document group before determining whether the number of words of the computed longest common subsequence is above the first threshold.

10. A computer-implemented method for content pattern based document classification in a file management system having a network storage containing multiple documents accessible to multiple members via a computer network, the method comprising:

receiving, from the network storage, data representing a document having a plurality of words in sequences and data representing a content pattern having a sequence of words corresponding to a document class having a class label, the sequence of words being shared by two additional documents in the network storage and having a length longer than a preset threshold;
in response to receiving the data representing the document,
determining a longest common subsequence of words between the words in the document and the sequence of words in the content pattern;
calculating a similarity percentage between the document and the sequence of words in the content pattern based on the determined longest common subsequence; and
when the calculated similarity percentage is above a threshold,
indicating that the received document belongs to the document class; and
modifying metadata of the received document to automatically apply the class label corresponding to the document class to the received document and storing the document with the automatically applied class label in the network storage of the file management system.

11. The method of claim 10, further comprising converting the received document to a plain text document before computing the longest common subsequence of words.

12. The method of claim 10 wherein the received sequence of words is derived by:
computing a longest common subsequence of words between first and second documents in the document class;
determining whether a number of words in the computed longest common subsequence is above another threshold; and
in response to determining that the number of words is above the another threshold, storing the computed longest common sequence of words as a content pattern in the network storage.

13. The method of claim 10 wherein the threshold is the same as the another threshold used to derive the sequence of words.

14. The method of claim 10 wherein the threshold is different than the another threshold used to derive the sequence of words.

15. The method of claim 10 wherein automatically applying the class label includes automatically modifying a metadata associated with the document to include the class label.

16. A computing device in a computer system having a network storage containing multiple documents accessible to multiple members via a computer network, the computing device comprising:
a processor; and
a memory containing instructions executable by the processor to cause the computing device to:
receive, from the network storage, data representing a first document and a second document, both the first and second documents having words in sequences;
in response to receiving the data representing the first and second documents,
compute a first longest common subsequence of words between the first and second documents, the computed first longest common subsequence having a number of words shared by the first and second documents; and upon determining that the number of words in the first longest common subsequence is above a first threshold:
  computing a second longest common subsequence between an additional document and the first longest common subsequence; and
  modifying metadata of the additional document in the network storage of the file management system to apply a class label corresponding to a document class of the first and second documents when the computed second longest common subsequence is above a second threshold, thereby automatically classifying the additional document as belonging to the document class.

17. The computing device of claim 16 wherein the memory contains additional instructions executable by the processor to cause the computing device to convert the first and second documents to first and second plain text documents before computing the longest common subsequence of words between the first and second plain text documents.

18. The computing device of claim 16 wherein the longest common subsequence is a first longest common subsequence, and wherein to classify additional documents includes to:
  in response to determining that the number of words of the second longest common subsequence is not above the threshold, indicate that the additional document belongs to another document class different than the document class.

19. The computing device of claim 16 wherein the memory includes additional instructions executable by the processor to cause the computing device to:
  in response to receiving the first and second documents, convert the first and second documents into first and second Hypertext Markup Language ("HTML") documents, respectively, both containing layout data and content data;
  remove the content data from both the first and second HTML documents;
  determine a similarity value between the layout data of the first and second HTML documents; and
  when the determined similarity value is above a layout threshold, group the first and second documents in a document group before determining whether the number of words of the computed longest common subsequence is above the first threshold.

20. The computing device of claim 16 wherein the memory includes additional instructions executable by the processor to cause the computing device to convert the first and second documents to first and second plain text documents by removing layout or format data from the first and second documents, and wherein computing the first longest common subsequence of words includes computing a first longest common subsequence of words between the first and second plain text documents.

* * * * *